United States Patent
Roche et al.

(10) Patent No.: US 8,339,625 B2
(45) Date of Patent: Dec. 25, 2012

(54) SECURE PRINT JOB MANAGEMENT USING MACHINE-READABLE MARKINGS IN AN IMAGE PRODUCTION DEVICE

(75) Inventors: Lee D. Roche, Biggleswade (GB); Francis Kapo Tse, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 696 days.

(21) Appl. No.: 12/551,652

(22) Filed: Sep. 1, 2009

(65) Prior Publication Data

US 2011/0051163 A1 Mar. 3, 2011

(51) Int. Cl.
*G06K 15/02* (2006.01)
*G06F 3/12* (2006.01)

(52) U.S. Cl. .................. 358/1.13; 358/1.14; 358/1.16; 358/1.17

(58) Field of Classification Search .................. 358/1.13, 358/1.14, 1.16, 1.17, 1.18
See application file for complete search history.

(56) References Cited

U.S. PATENT DOCUMENTS

| | | | |
|---|---|---|---|
| 5,646,744 A | 7/1997 | Knox | |
| 6,856,432 B2 | 2/2005 | Bobrow et al. | |
| 6,873,430 B2 * | 3/2005 | Grasso et al. | 358/1.16 |
| 6,964,374 B1 * | 11/2005 | Djuknic et al. | 235/462.01 |
| 7,558,983 B2 | 7/2009 | Tanimoto | |
| 8,089,640 B2 * | 1/2012 | Adams | 358/1.12 |
| 2002/0034392 A1 * | 3/2002 | Baum et al. | 396/564 |
| 2002/0109865 A1 * | 8/2002 | Gatto et al. | 358/471 |
| 2003/0152231 A1 * | 8/2003 | Tomita et al. | 380/258 |
| 2003/0220822 A1 * | 11/2003 | Fiala et al. | 705/3 |
| 2008/0055626 A1 * | 3/2008 | Root et al. | 358/1.14 |

* cited by examiner

*Primary Examiner* — King Poon
*Assistant Examiner* — Allen H Nguyen
(74) *Attorney, Agent, or Firm* — Ronald E. Prass, Jr.

(57) ABSTRACT

A method for secure print job management using machine-readable markings in an image production device is disclosed. The method may include receiving a signal to print a secure print job from a user, identifying the user, generating a machine-readable marking based on the identification of the user, storing the secure print job and the generated machine-readable marking, receiving a signal to release the secure print job, retrieving the generated machine-readable marking, scanning the user's machine-readable marking, determining if the information encoded in the user's machine-readable marking matches the information encoded in the generated machine-readable marking; wherein if it is determined that the information encoded in the user's machine-readable marking matches the information encoded in the generated machine-readable marking, printing the secure print job.

12 Claims, 4 Drawing Sheets

SECURE PRINT JOB MANAGEMENT USING MACHINE-READABLE MARKINGS IN AN IMAGE PRODUCTION DEVICE

BACKGROUND

Disclosed herein is a method for secure print job management using machine-readable markings in an image production device, as well as the corresponding apparatus and computer-readable medium.

Secure printing on conventional image production devices requires the user of the machine to enter a personal identification number (PIN) code which is entered at the print driver user interface when sending a job and then reentered when releasing the secure print job or fax at the local user interface. This process can be cumbersome and add unwanted steps to the user's workflow.

SUMMARY

A method for secure print job management using machine-readable markings in an image production device is disclosed. The method may include receiving a signal to print a secure print job from a user, identifying the user, generating a machine-readable marking based on the identification of the user, storing the secure print job and the generated machine-readable marking, receiving a signal to release the secure print job, retrieving the generated machine-readable marking, scanning the user's machine-readable marking, determining if the user's machine-readable marking matches the generated machine-readable marking; wherein if it is determined that the user's machine-readable marking matches the generated machine-readable marking, printing the secure print job.

DETAILED DESCRIPTION

Figure 1:
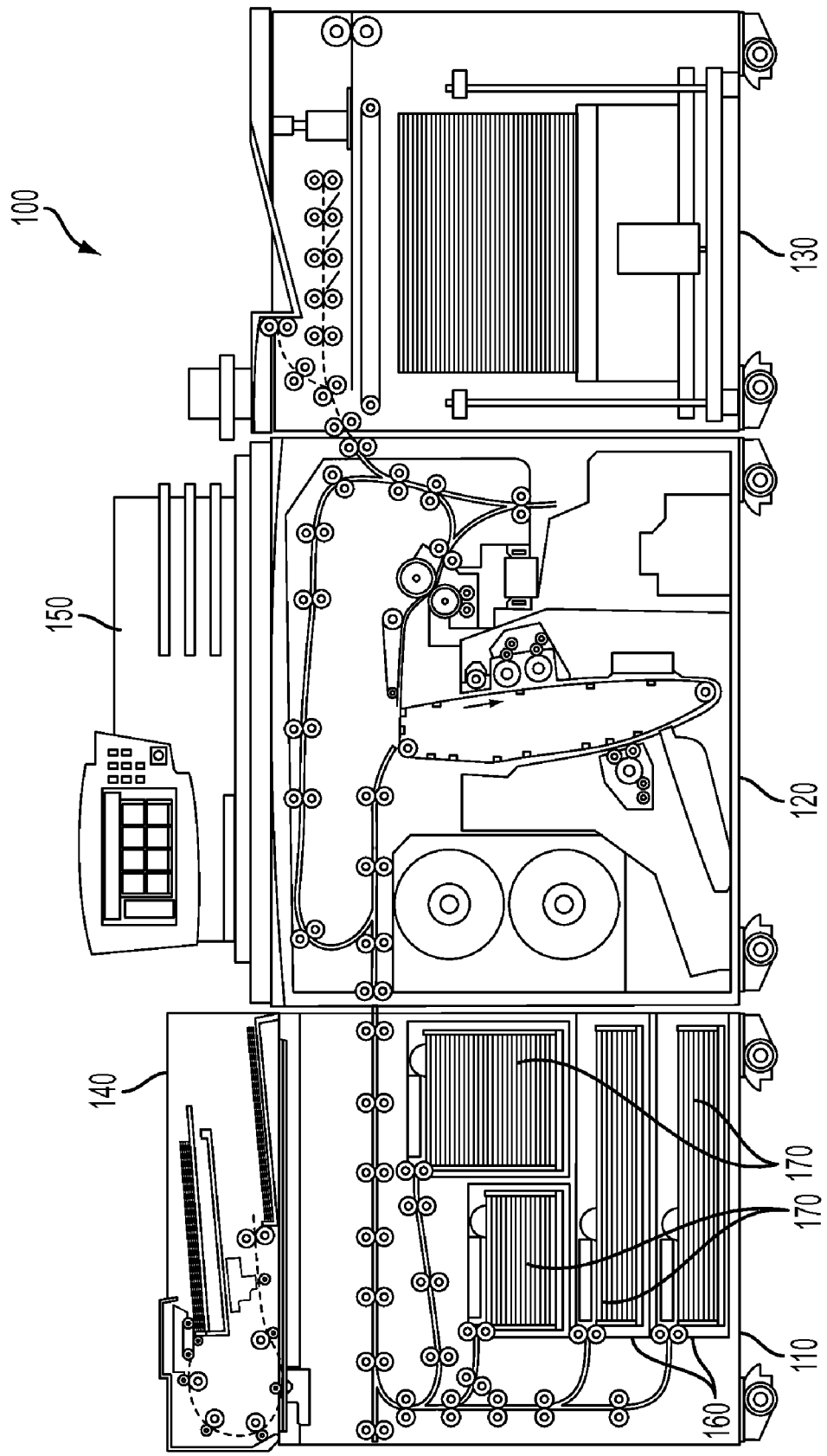
FIG. 1 is an exemplary diagram of an image production device in accordance with one possible embodiment of the disclosure.

Aspects of the embodiments disclosed herein relate to a method for secure print job management using machine-readable markings in an image production device, as well as corresponding apparatus and computer-readable medium.

The disclosed embodiments may include a method for secure print job management using machine-readable markings in an image production device. The method may include receiving a signal to print a secure print job from a user, identifying the user, generating a machine-readable marking based on the identification of the user, storing the secure print job and the generated machine-readable marking, receiving a signal to release the secure print job, retrieving the generated machine-readable marking, scanning the user's machine-readable marking, determining if the user's machine-readable marking matches the generated machine-readable marking; wherein if it is determined that the information encoded in the user's machine-readable marking matches the information encoded in the generated machine-readable marking, printing the secure print job.

The disclosed embodiments may further include an image production device having a memory, a scanner that scans documents, an image production section that produces images of documents, and a secure print job management unit that receives a signal to print a secure print job from a user; identifies the user, generates a machine-readable marking based on the identification of the user, stores the secure print job and the generated machine-readable marking in the memory, receives a signal to release the secure print job, retrieves the generated machine-readable marking from the memory, scans the user's machine-readable marking using the scanner, determines if the information encoded in the user's machine-readable marking matches the information encoded in the generated machine-readable marking, wherein if the secure print job management unit determines that the information encoded in the user's machine-readable marking matches the information encoded in the generated machine-readable marking, the image production section prints the secure print job.

The disclosed embodiments may further include a computer-readable medium storing instructions for controlling a computing device for secure print job management using machine-readable markings in an image production device. The instructions may include receiving a signal to print a secure print job from a user, identifying the user, generating a machine-readable marking based on the identification of the user, storing the secure print job and the generated machine-readable marking, receiving a signal to release the secure print job, retrieving the generated machine-readable marking, scanning the user's machine-readable marking, determining if the information encoded in the user's machine-readable marking matches the information encoded in the generated machine-readable marking; wherein if it is determined that the information encoded in the user's machine-readable marking matches the information encoded in the generated machine-readable marking, printing the secure print job.

The disclosed embodiments may concern secure print job management using machine-readable markings in an image production device. This process may include using machine-readable markings, such as the Xerox Dataglyph encoded mark for example, on media sheet technology to supplement current secure print process. Ordinary media sheets or in the alternative, Automatic Setup SMart Paper may be generated by a user at anytime and have encoded into their user name and identification information (ID). The encoded document may take the form of a sheet of paper or a laminated security card, for example. Since Automatic Setup SMart Paper can be emailed and FAXed, damaged setup sheets may easily be replace by calling the Xerox Welcome or logging in to a central facility such as xerox.com to obtain a new one.

When a job is submitted for example, a machine-readable marking may be automatically generated for the print job based on the user's ID. The print job may then be held until the machine-readable marking is matched.

When the user wishes to release the secure print job, he or she may approach the machine and place the machine-readable marking on the machine and press a button. The machine may scan the machine-readable marking then matches the user's ID to any secure jobs held on the machine. All or a portion of the secure print jobs (depending of the user's preference) may then be released for printing that matches the user's ID.

This process may enhance the secure print features with further options for security. The presentation of the machine-readable marking (such as the DataGlyph) is not limited to marks printed on paper or card stock. Machine-readable markings can also be displayed on mobile devices such as smart phones as a means of presenting the authorization to release the print jobs, for example.

FIG. 1 is an exemplary diagram of an image production device 100 in accordance with one possible embodiment of the disclosure. The image production device 100 may be any device that may be capable of making image production documents (e.g., printed documents, copies, etc.) including a copier, a printer, a facsimile device, and a multi-function device (MFD), for example.

The image production device 100 may include an image production section 120, which includes hardware by which image signals are used to create a desired image, as well as a stand-alone feeder section 110, which stores and dispenses sheets on which images are to be printed, and an output section 130, which may include hardware for stacking, folding, stapling, binding, etc., prints which are output from the marking engine. If the printer is also operable as a copier, the printer further includes a document feeder 140, which operates to convert signals from light reflected from original hardcopy image into digital signals, which are in turn processed to create copies with the image production section 120. The image production device 100 may also include a local user interface 150 for controlling its operations, although another source of image data and instructions may include any number of computers to which the printer is connected via a network.

With reference to feeder section 110, the module includes any number of trays 160, each of which stores a media stack 170 or print sheets ("media") of a predetermined type (size, weight, color, coating, transparency, etc.) and includes a feeder to dispense one of the sheets therein as instructed. Certain types of media may require special handling in order to be dispensed properly. For example, heavier or larger media may desirably be drawn from a media stack 170 by use of an air knife, fluffer, vacuum grip or other application (not shown in the Figure) of air pressure toward the top sheet or sheets in a media stack 170. Certain types of coated media are advantageously drawn from a media stack 170 by the use of an application of heat, such as by a stream of hot air (not shown in the Figure). Sheets of media drawn from a media stack 170 on a selected tray 160 may then be moved to the image production section 120 to receive one or more images thereon. Then, the printed sheet is then moved to output section 130, where it may be collated, stapled, folded, etc., with other media sheets in manners familiar in the art.

Figure 2:
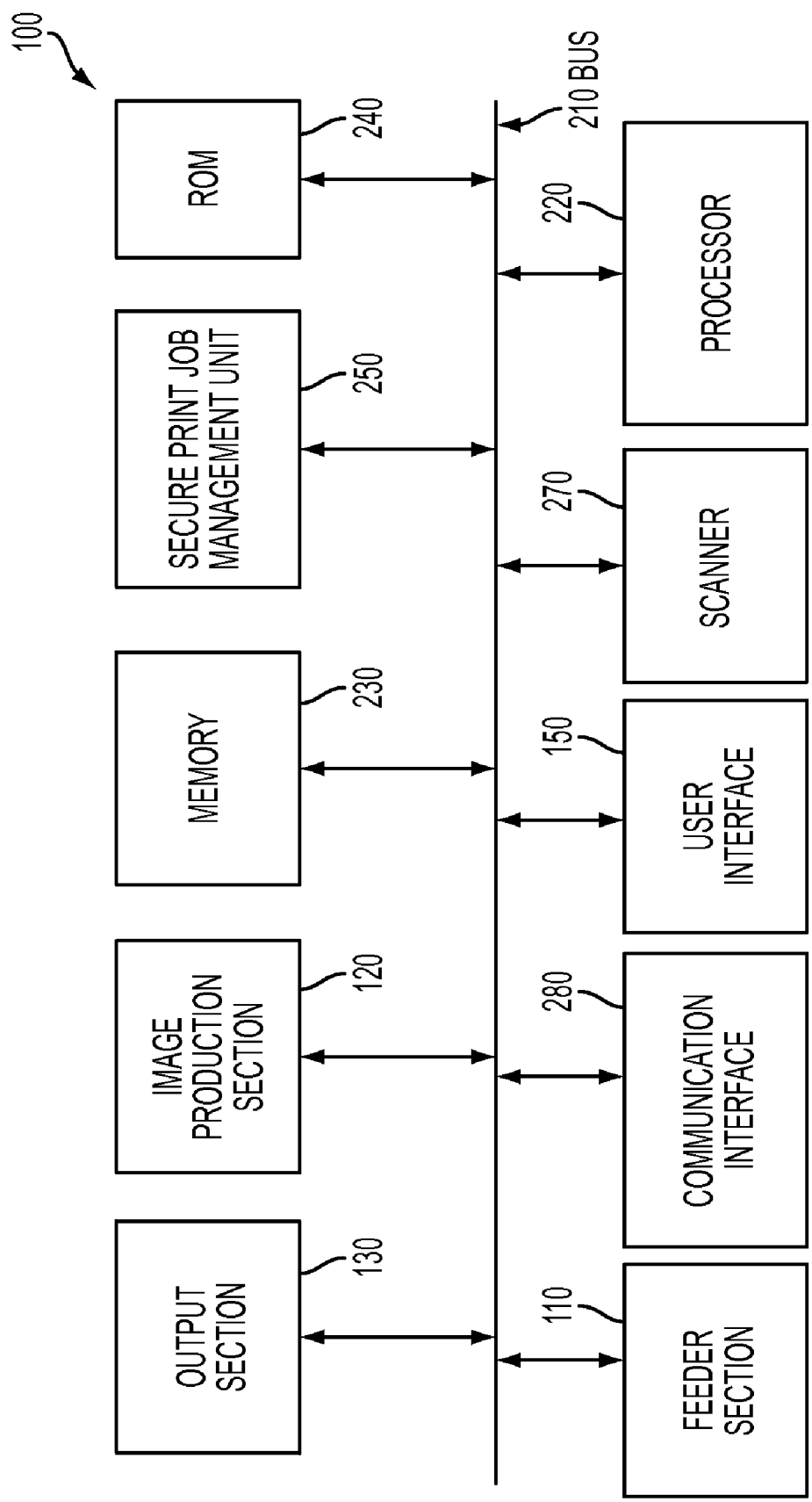
FIG. 2 is an exemplary block diagram of the image production device in accordance with one possible embodiment of the disclosure.

FIG. 2 is an exemplary block diagram of the image production device 100 in accordance with one possible embodiment of the disclosure. The image production device 100 may include a bus 210, a processor 220, a memory 230, a read only memory (ROM) 240, a secure print job management unit 250, a feeder section 110, an output section 130, a user interface 150, a communication interface 280, an image production section 120, and a scanner 270. Bus 210 may permit communication among the components of the image production device 100.

Processor 220 may include at least one conventional processor or microprocessor that interprets and executes instructions. Memory 230 may be a random access memory (RAM) or another type of dynamic storage device that stores information and instructions for execution by processor 220. Memory 230 may also include a read-only memory (ROM) which may include a conventional ROM device or another type of static storage device that stores static information and instructions for processor 220.

Communication interface 280 may include any mechanism that facilitates communication via a network. For example, communication interface 280 may include a modem. Alternatively, communication interface 280 may include other mechanisms for assisting in communications with other devices and/or systems.

ROM 240 may include a conventional ROM device or another type of static storage device that stores static information and instructions for processor 220. A storage device may augment the ROM and may include any type of storage media, such as, for example, magnetic or optical recording media and its corresponding drive.

User interface 150 may include one or more conventional mechanisms that permit a user to input information to and interact with the image production unit 100, such as a keyboard, a display, a mouse, a pen, a voice recognition device, touchpad, buttons, etc., for example. Output section 130 may include one or more conventional mechanisms that output image production documents to the user, including output trays, output paths, finishing section, etc., for example. The image production section 120 may include an image printing and/or copying section, a scanner, a fuser, etc., for example.

The scanner 270 may be any device that may scan documents and may create electronic images from the scanned document. The scanner 270 may also scan, recognize, and decipher marking-readable codes or makings, for example.

The image production device 100 may perform such functions in response to processor 220 by executing sequences of instructions contained in a computer-readable medium, such as, for example, memory 230. Such instructions may be read into memory 230 from another computer-readable medium, such as a storage device or from a separate device via communication interface 280.

The image production device 100 illustrated in FIGS. 1-2 and the related discussion are intended to provide a brief, general description of a suitable communication and processing environment in which the disclosure may be implemented. Although not required, the disclosure will be described, at least in part, in the general context of computer-executable instructions, such as program modules, being executed by the image production device 100, such as a communication server, communications switch, communications router, or general purpose computer, for example.

Generally, program modules include routine programs, objects, components, data structures, etc. that perform particular tasks or implement particular abstract data types. Moreover, those skilled in the art will appreciate that other embodiments of the disclosure may be practiced in communication network environments with many types of communication equipment and computer system configurations, including personal computers, hand-held devices, multi-processor systems, microprocessor-based or programmable consumer electronics, and the like that are capable of displaying the print release marking and can be scanned by the image production device.

The operation of components of the secure print job management unit 250 and the secure print job management process will be discussed in relation to the flowchart in FIG. 3.

Figure 3:
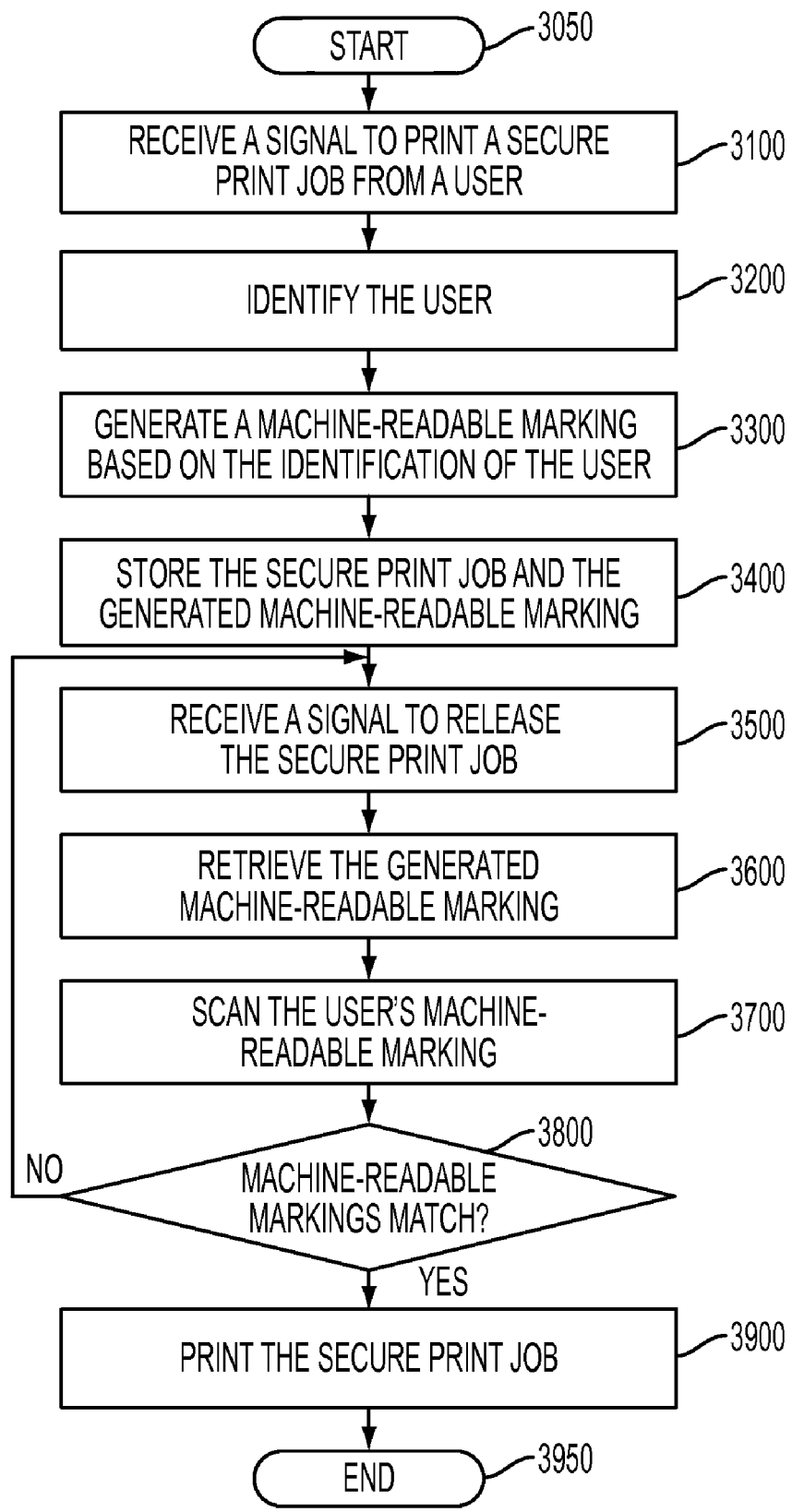
FIG. 3 is a flowchart of an exemplary secure print job management process in accordance with one possible embodiment of the disclosure.

FIG. 3 is a flowchart of a secure print job management process in accordance with one possible embodiment of the disclosure. The method begins at 3050, and continues to 3100 where the secure print job management unit 250 may receive a signal to print a secure print job from a user. At step 3200, the secure print job management unit 250 may identify the user.

Figure 4:
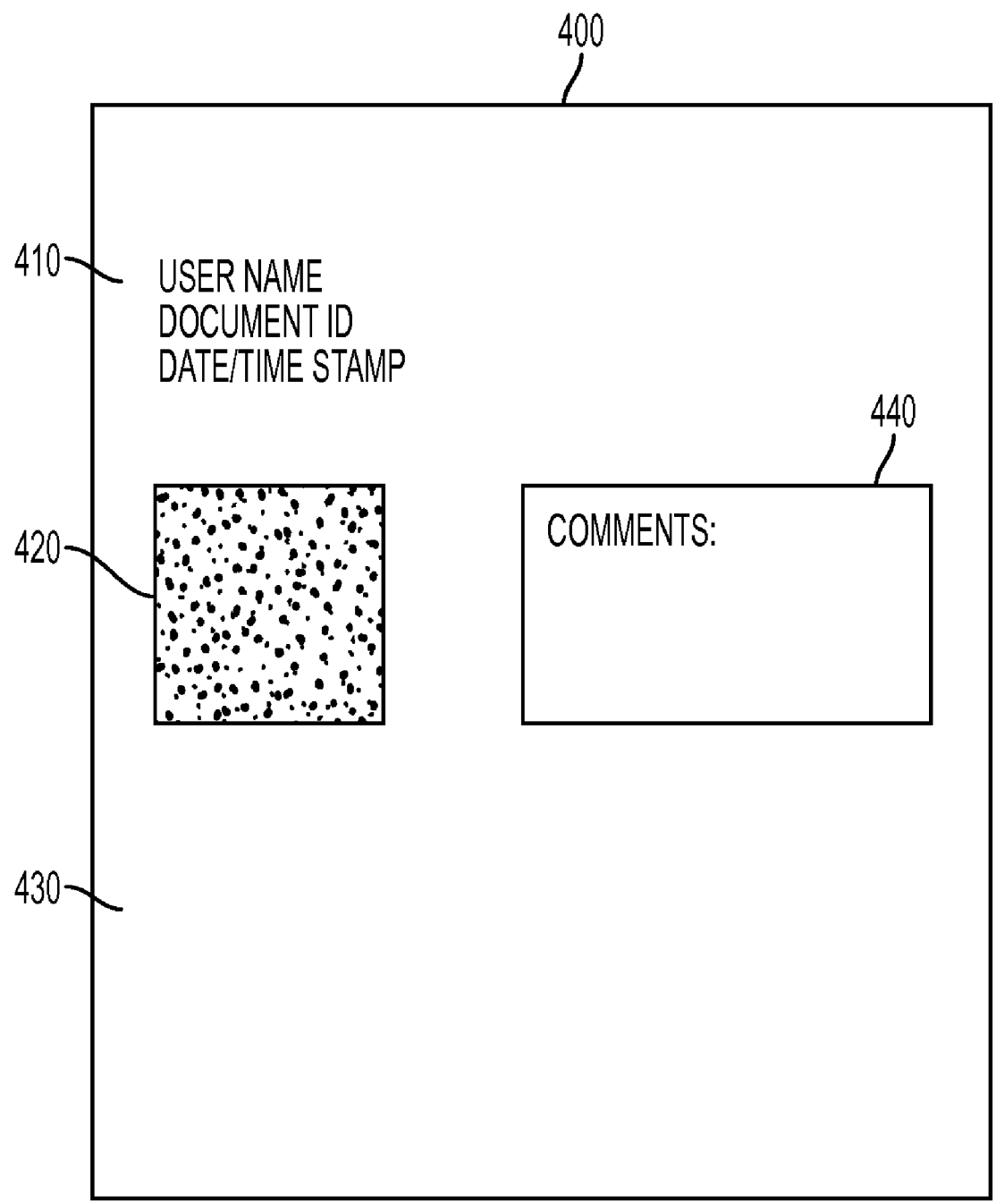
FIG. 4 is an exemplary user identification sheet with exemplary machine-readable markings in accordance with one possible embodiment of the disclosure.

At step 3300, the secure print job management unit 250 may generate a machine-readable marking based on the identification of the user. FIG. 4 is an exemplary user identification sheet 400 with an exemplary machine-readable marking 420 in accordance with one possible embodiment of the disclosure. The machine-readable marking 420 may be a one-dimensional bar code, a two-dimensional bar code, a three-dimensional bar code or a data glyph, or any other encoded marking known to one of skill in the art, for example. The machine-readable marking 420 may be located on a predetermined portion of an electronic image or a printed media sheet, for example. The exemplary user identification sheet 400 may also optionally have identification information 410 in text form and a comments section 440. Area 430 may utilized for other purposes just as additional text, images or machine-readable markings, for example.

At step 3400, the secure print job management unit 250 may store the secure print job and the generated machine-readable marking in the memory 230. At step 3500, the secure print job management unit 250 may receive a signal to release the secure print job. The release may be performed by the user or user's representative at the user interface 150, a separate user interface, or a remote user interface, for example.

At step 3600, the secure print job management unit 250 may retrieve the generated machine-readable marking from the memory 230. At step 3700, the secure print job management unit 250 may scan the user's machine-readable marking using the scanner 270. The secure print job management unit 250 may have generated the user's machine-readable marking at any time or it may have been generated by at separate machine or device. The user's machine-readable marking may be placed on a media sheet, placed on a card, or generated in an electronic form and contains identification information concerning the user. The user's machine-readable marking may also be stored on a remote processing device, for example such as a computer, a server, a personal data assistant, a mobile telephone, or an MP3 player. If the user loses or misplaces the sheet or card containing his or her machine-readable marking, it may be easily replaced from one of these devices, for example.

At step 3800, the secure print job management unit 250 may determine if the information encoded in the user's machine-readable marking matches the information encoded in the generated machine-readable marking. If the secure print job management unit 250 determines that the information encoded in the user's machine-readable marking does not match the information encoded in the generated machine-readable marking, the process may return to step 3500.

If at step 3800, the secure print job management unit 250 determines that the information encoded in the user's machine-readable marking matches the information encoded in the generated machine-readable marking, at step 3900 the image production section 120 may retrieve the print job from memory 230 (if not already retrieved) and print the secure print job. The process may then go to step 3950 and end.

Embodiments as disclosed herein may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, and the like that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described therein. It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for secure print job management within an image production device, comprising:
   receiving a signal to print a secure print job from a user;
   identifying the user;
   generating a machine-readable marking for the user based on the identification of the user that contains identification information concerning the user, wherein the generated machine-readable marking is placed on one of a media sheet, placed on a card, generated in an electronic form, and stored in at least one remote processing device, wherein the remote processing device is one of a computer, a server, a personal data assistant, a mobile telephone, and an MP3 player, and wherein the encoded machine-readable marking can be displayed and scanned by the image production device;
   storing the secure print job and the generated machine-readable marking;
   receiving a signal to release the secure print job;
   retrieving the generated machine-readable marking;
   scanning the user's machine-readable marking;
   determining if the information encoded in the user's machine-readable marking matches the information encoded in the generated machine-readable marking;
   wherein if it is determined that the information encoded in the user's machine-readable marking matches the information encoded in the generated machine-readable marking,
   printing the secure print job.

2. The method of claim 1, wherein the machine-readable marking is at least one of a one-dimensional bar code, a two-dimensional bar code, a three-dimensional bar code and a data glyph.

3. The method of claim 1, wherein the machine-readable marking is located on a predetermined portion of one of an image and a media sheet.

4. The method of claim 1, wherein the image production device is one of a copier, a printer, a facsimile device, and a multi-function device.

5. An image production device, comprising:
a memory;
a scanner that scans documents;
an image production section that produces images of documents; and
a secure print job management unit that receives a signal to print a secure print job from a user; identifies the user, generating a machine-readable marking for the user based on the identification of the user that contains identification information concerning the user, stores the secure print job and the generated machine-readable marking in the memory, receives a signal to release the secure print job, retrieves the generated machine-readable marking from the memory, scans the user's machine-readable marking using the scanner, determines if the information encoded in the user's machine-readable marking matches the information encoded in the generated machine-readable marking, wherein if the secure print job management unit determines that the information encoded in the user's machine-readable marking matches the information encoded in the generated machine-readable marking, the image production section prints the secure print job;
wherein the generated machine-readable marking is placed on one of a media sheet, placed on a card, generated in an electronic form, and stored in at least one remote processing device, wherein the remote processing device is one of a computer, a server, a personal data assistant, a mobile telephone, and an MP3 player, and wherein the encoded machine-readable marking can be displayed and scanned by the image production device.

6. The image production device of claim 5, wherein the machine-readable marking is at least one of a one-dimensional bar code, a two-dimensional bar code, a three-dimensional bar code and a data glyph.

7. The image production device of claim 5, wherein the machine-readable marking is located on a predetermined portion of one of an image and a media sheet.

8. The image production device of claim 5, wherein the image production device is one of a copier, a printer, a facsimile device, and a multi-function device.

9. A non-transitory computer-readable medium storing instructions for controlling a computing device for secure print job management within an image production device, the instructions comprising:
receiving a signal to print a secure print job from a user;
identifying the user;
generating a machine-readable marking for the user based on the identification of the user that contains identification information concerning the user, wherein the generated machine-readable marking is placed on one of a media sheet, placed on a card, generated in an electronic form, and stored in at least one remote processing device, wherein the remote processing device is one of a computer, a server, a personal data assistant, a mobile telephone, and an MP3 player, and wherein the encoded machine-readable marking can be displayed and scanned by the image production device;
storing the secure print job and the generated machine-readable marking;
receiving a signal to release the secure print job;
retrieving the generated machine-readable marking;
scanning the user's machine-readable marking;
determining if the information encoded in the user's machine-readable marking matches the information encoded in the generated machine-readable marking; wherein if it is determined that the information encoded in the user's machine-readable marking matches the information encoded in the generated machine-readable marking,
printing the secure print job.

10. The non-transitory computer-readable medium of claim 9, wherein the machine-readable marking is at least one of a one-dimensional bar code, a two-dimensional bar code, a three-dimensional bar code and a data glyph.

11. The non-transitory computer-readable medium of claim 9, wherein the machine-readable marking is located on a predetermined portion of one of an image and a media sheet.

12. The non-transitory computer-readable medium of claim 9, wherein the image production device is one of a copier, a printer, a facsimile device, and a multi-function device.

* * * * *